United States Patent
Wurst

(10) Patent No.: US 11,898,627 B1
(45) Date of Patent: Feb. 13, 2024

(54) CLUTCH PLATE ANTI-RATTLE FEATURE

(71) Applicant: Schaeffler Technologies AG & Co. KG, Herzogenaurach (DE)

(72) Inventor: Nicholas Wurst, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/206,792

(22) Filed: Jun. 7, 2023

(51) Int. Cl.
*F16H 45/02* (2006.01)
*F16H 57/00* (2012.01)

(52) U.S. Cl.
CPC ......... *F16H 45/02* (2013.01); *F16H 57/0006* (2013.01); *F16H 2045/0221* (2013.01)

(58) Field of Classification Search
CPC ..... F16H 2045/0221; F16H 2045/0289; F16D 13/648; F16D 13/64; F16D 13/644; F16D 13/646
See application file for complete search history.

(56) References Cited

U.S. PATENT DOCUMENTS

| | | | | |
|---|---|---|---|---|
| 6,293,380 B1* | 9/2001 | Arhab | ..................... | F16H 45/02 192/3.29 |
| 6,390,263 B1* | 5/2002 | Arhab | ..................... | F16H 45/02 192/3.29 |
| 8,240,441 B2* | 8/2012 | Heeke | ..................... | F16H 45/02 192/3.25 |
| 9,217,498 B2* | 12/2015 | Sturgin | ................... | F16H 45/02 |
| 9,249,871 B2* | 2/2016 | Aoki | ...................... | F16H 45/02 |
| 11,560,941 B1 | 1/2023 | Wurst et al. | | |
| 2011/0247322 A1* | 10/2011 | Lindemann | ....... | F16F 15/13484 464/99 |

FOREIGN PATENT DOCUMENTS

FR 2797015 A1 * 2/2001 ............. F16H 45/02

* cited by examiner

*Primary Examiner* — Stacey A Fluhart

(57) ABSTRACT

A torque converter includes a front cover arranged to receive a torque and a lock-up clutch engaged with the front cover. The lock-up clutch includes a reaction plate, a clutch plate, and an anti-rattle plate. The reaction plate is fixed to the front cover and includes a plurality of windows circumferentially spaced from each other. The clutch plate includes a plurality of tabs each engaged with the reaction plate via one respective window. The anti-rattle plate is fixed relative to the front cover and engaged with each of the plurality of tabs in the corresponding windows.

20 Claims, 5 Drawing Sheets

CLUTCH PLATE ANTI-RATTLE FEATURE

TECHNICAL FIELD

The present disclosure relates generally to a clutch plate for a torque converter, and more specifically to an anti-rattle feature for a clutch plate and a torque converter including the anti-rattle feature.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling.

Clutch plates generally have a driving connection with a reaction plate that is non-rotatably connected to the impeller. For example, the clutch plates may include tabs arranged in corresponding windows in the reaction plate. Due to radial tolerances between the tabs and sides of the corresponding windows, the clutch plate may vibrate or rattle against the reaction plate as a result of engine speed fluctuations and general operating conditions. Accordingly, it is desirable to have alternative designs and configurations to reduce noise, vibration, and harshness (NVH) between the clutch plate and the reaction plate.

SUMMARY

Embodiments of the present disclosure provide a torque converter including a front cover arranged to receive a torque and a lock-up clutch engaged with the front cover. The lock-up clutch includes a reaction plate fixed to the front cover. The reaction plate includes a plurality of windows circumferentially spaced from each other. The lock-up clutch further includes a clutch plate including a plurality of tabs each engaged with the reaction plate via one respective window. The lock-up clutch further includes an anti-rattle plate fixed relative to the front cover and engaged with each tab in the corresponding windows.

In embodiments, the anti-rattle plate may circumferentially compress each tab against the reaction plate in the corresponding windows. In embodiments, the plurality of tabs may be configured to receive a drive torque and transmit a coast torque. In embodiments, the clutch plate may include a plurality of further tabs each being engaged with the reaction plate via one respective window. Each of the plurality of tabs may be circumferentially spaced from each of the plurality of further tabs. The plurality of tabs and the plurality of further tabs may be alternating arranged circumferentially about the clutch plate. Each of the plurality of further tabs may be configured only to receive a drive torque. The plurality of tabs may be configured to receive the drive torque and to transmit a coast torque.

In embodiments, the anti-rattle plate may include a plurality of fingers circumferentially spaced from each other. Each finger may contact one respective tab in one respective window. The plurality of fingers may extend radially outward from an outer diameter of the anti-rattle plate.

In embodiments, each window may include a drive side and a coast side spaced circumferentially from the drive side. The plurality of tabs may each be in contact with the drive side of the respective window and may each be spaced from the coast side of the respective window. The clutch plate may be arranged to receive a drive torque via interfaces between each tab and the respective drive side of the corresponding windows. The anti-rattle plate may include a plurality of fingers each configured to engage one respective tab. Each finger may contact the one respective tab in the one respective window. Each of the plurality of fingers may be spaced from the respective coast side of the one respective window. The clutch plate may be arranged to transmit a coast torque via interfaces between each finger and the corresponding tabs.

In embodiments, the reaction plate may include a plurality of notches circumferentially spaced from each other. Each notch may be arranged between two circumferentially adjacent windows of the plurality of windows. The anti-rattle plate may include a plurality of fingers fixed to the front cover. Each of the fingers may extend through one respective notch. The anti-rattle plate may include a plurality of further fingers each arranged circumferentially adjacent to one respective finger. Each further finger may extend through one of the two circumferentially adjacent windows. Each tab may be arranged circumferentially between one respective finger and one respective further finger. The plurality of further fingers may be arranged to receive a coast torque from the clutch plate. Each tab may be in contact with the reaction plate and one respective further finger in the one of the two circumferentially adjacent windows.

In embodiments, the clutch plate may be disposed axially between the anti-rattle plate and the front cover.

Embodiments of the present disclosure further provide a method for assembling a torque converter including providing a front cover defining a cavity. The method further includes inserting a clutch plate into the cavity, wherein the clutch plate includes a plurality of tabs. The method further includes providing a reaction plate including a plurality of windows circumferentially spaced from each other. The method further includes coupling the clutch plate to the reaction plate by inserting each of the tabs into one respective window. The method further includes aligning an anti-rattle plate relative to the reaction plate. The method further includes pressing the anti-rattle plate into the cavity. The method further includes rotating the anti-rattle plate relative to the reaction plate to compress the tabs against the reaction plate in the respective windows. The method further includes fixing the reaction plate and the anti-rattle plate to the front cover.

Instead of permitting a lash connection between the clutch plate and the reaction plate, embodiments described herein provide an anti-rattle plate fixed to a front cover of a torque converter and having a plurality of fingers each configured to engage a respective tab of a clutch plate in a corresponding window of a reaction plate. Further, during assembly, the anti-rattle plate is rotated such that the plurality of fingers each compress the respective tabs of the clutch plate against the reaction plate in the corresponding windows. This can reduce or eliminate radial lash between the clutch plate and the reaction plate, which can reduce NVH between the clutch plate and the reaction plate when a lock-up clutch is open, i.e., not transmitting torque.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
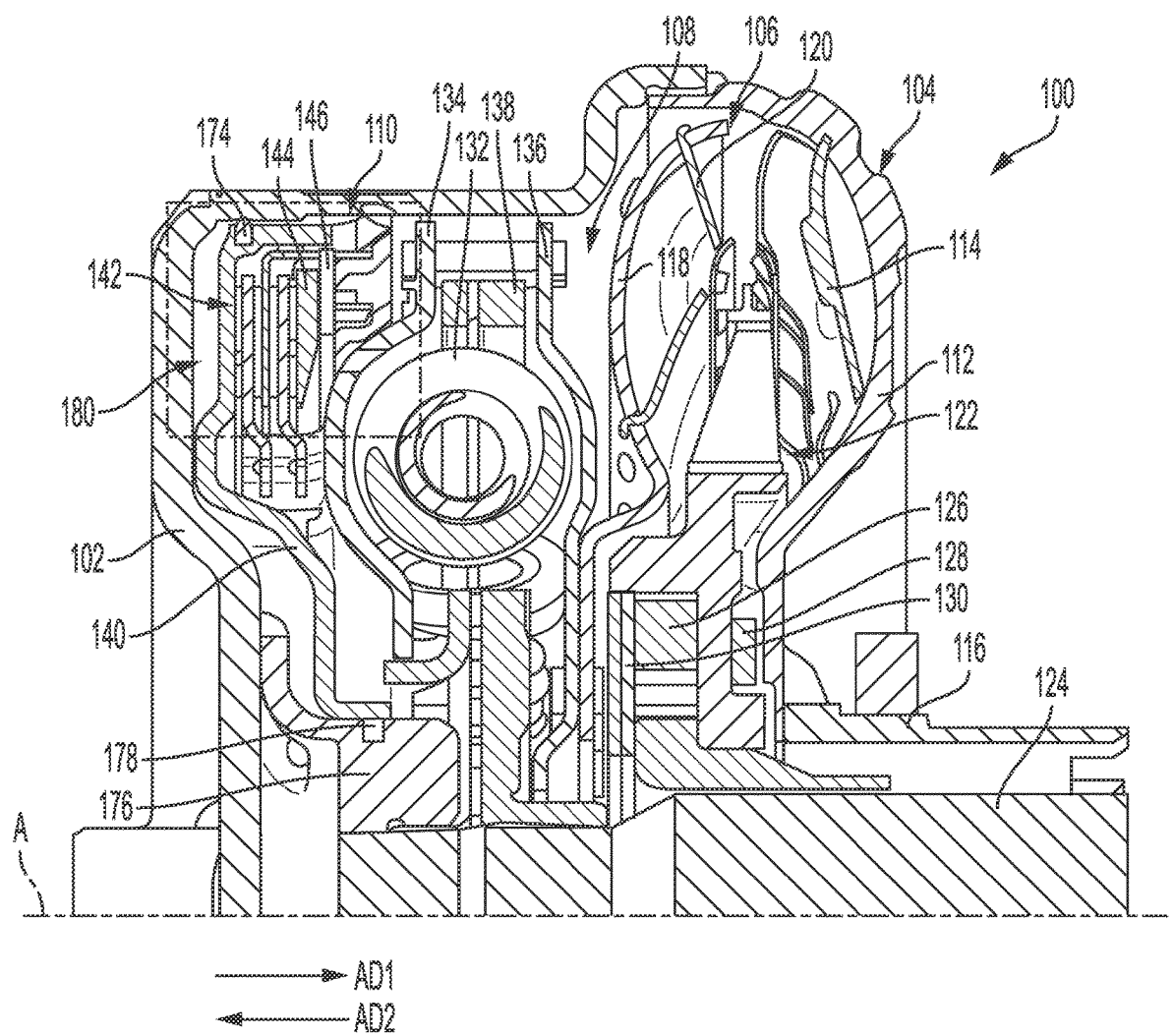
FIG. 1 a cross-sectional view of a torque converter according to the present disclosure.
Figure 2A:
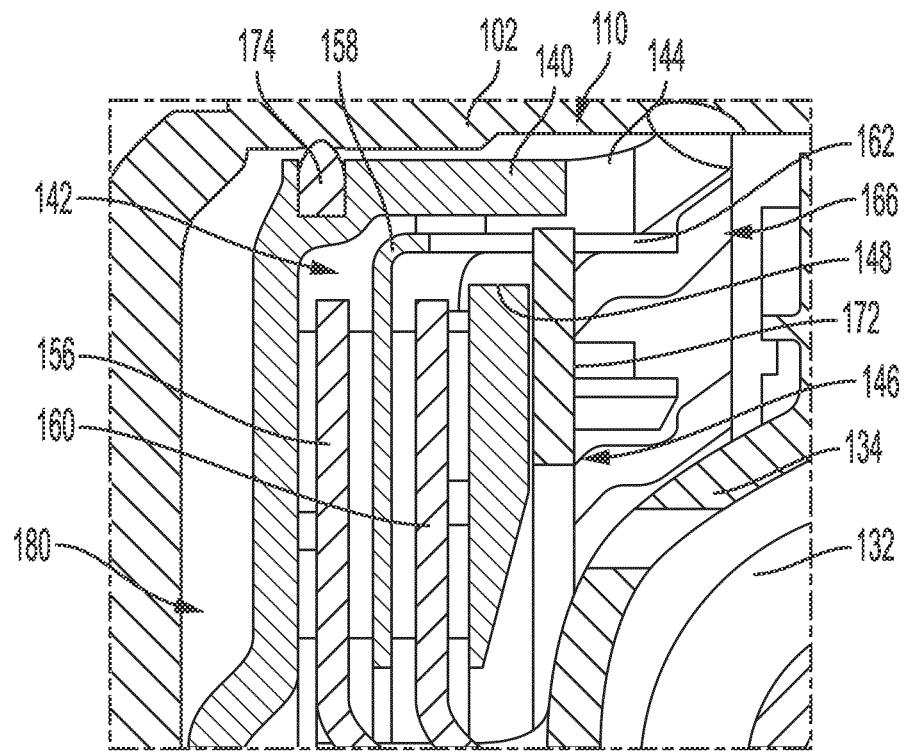
FIG. 2A illustrates an enlarged view of an area of the torque converter shown in FIG. 1.
Figure 2B:
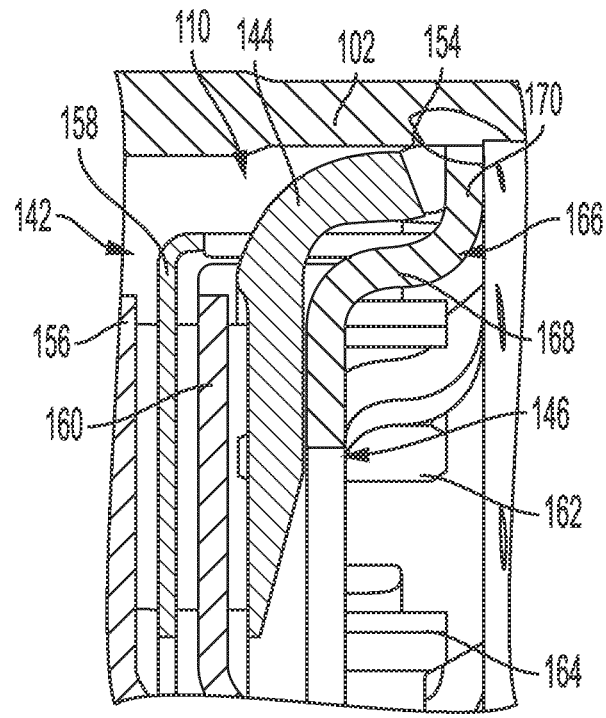
FIG. 2B illustrates an area circumferentially offset from the area of the torque converter shown in in FIG. 2A.

Referring to FIGS. 1-2B, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a damper assembly 108; and a lock-up clutch assembly 110. The impeller assembly 104 includes: an impeller shell 112 non-rotatably connected to the front cover 102; at least one impeller blade 114 attached to an inner surface of the impeller shell 112; and an impeller hub 116 fixed to a radially inner end of the impeller shell 112. The turbine assembly 106 includes: a turbine shell 118; and at least one turbine blade 120 attached to the turbine shell 118. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Torque converter 100 may include: a stator 122 disposed axially between the impeller assembly 104 and the turbine assembly 106 to redirect fluid flowing from the turbine blade 120 before the fluid reaches the impeller assembly 104 to increase an efficiency of the torque converter 100. For example, the impeller blade 114, when rotated about the central axis A, pushes the fluid outwardly. The fluid pushes against the turbine assembly 106 of the torque converter 100, causing the turbine assembly 106 to revolve about the central axis A. The stator 122 functions to return the fluid from the turbine assembly 106 back to the impeller assembly 104 with minimal or no power loss. Drive power is transmitted from the turbine assembly 106 to a transmission input shaft 124. The torque converter 100 may, for example, further include: a one-way clutch 126 disposed within the stator 122, a thrust bearing 128 disposed axially between the stator 122 and the impeller shell 112, and a side plate 130 configured to retain the one-way clutch 126 within the stator 122.

The damper assembly 108 is positioned axially between the front cover 102 and the turbine assembly 106 and is configured to transfer torque from the front cover 102 to the transmission input shaft 124. The damper assembly 108 includes: a spring 132; cover plates 134, 136; and an output flange 138.

The cover plate 134 may support the spring 132 on one axial side. The cover plate 136 may support the spring 132 on another, opposite axial side. The cover plates 134, 136 may be connected to each other, for example, via a rivet, radially outward of spring 132. The cover plate 134 may be connected to the lock-up clutch assembly 110 (as described further below), and the cover plate 136 may be connected to the turbine shell 118. That is, the cover plates 134, 136 are arranged to act as an input to the damper assembly 108.

The lock-up clutch assembly 110 is configured to selectively transfer torque from the front cover 102 to the transmission input shaft 124. The lock-up clutch assembly 110 includes a piston 140, a clutch pack 142, a reaction plate 144, and an anti-rattle plate 146. The reaction plate 144 may be fixed to the front cover 102 via a weld, for example. The reaction plate 144, e.g., at least a portion thereof, is arranged axially between the piston 140 and the anti-rattle plate 146.

The piston 140 is axially slidable to compress the clutch pack 142 against the reaction plate 144. The piston 140 may be disposed axially between the front cover 102 and the clutch pack 142 and configured to be sealed to the front cover 102 at an outer end thereof via a seal 174 and sealed to a hub 176 at an inner end thereof via a seal 178. The piston 140 may further be connected to the front cover 102 via a leaf-spring connection that allows axial displacement of the piston 140 in a first axial direction AD1 and a second axial direction AD2 for selective engagement of the lock-up clutch assembly 110.

During axial movement of the piston 140, the piston 140 slides along the hub 176. The piston 140 closes the lock-up clutch assembly 110 in response to pressurization of a medium (e.g., fluid such as oil) in a piston apply chamber 180 defined between the front cover 102 and the piston 140. Seals 174, 178 maintain a fluid separation between the piston apply chamber 180 and the rest of the torque converter 100. The piston apply chamber 180 is further defined by, or bounded between, the front cover 102, the hub 176, the seal 174, the piston 140, and the seal 178. By "bounded in part," we mean that a portion of the cited chamber, flow path, or other structure is bounded, or formed, by the cited element.

Figure 3:
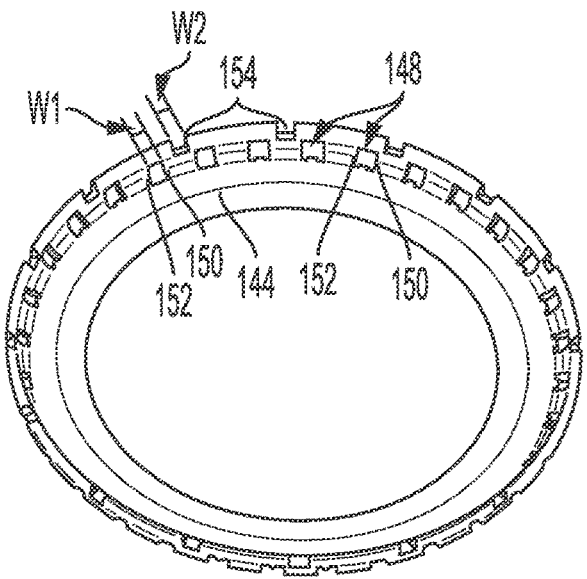
FIG. 3 illustrates a perspective view of a reaction plate of the torque converter shown in FIG. 1.

With reference to FIG. 3, the reaction plate 144 includes a plurality of windows 148 extending axially therethrough. The windows 148 are spaced from each other circumferentially about the central axis A. The windows 148 each include a drive side 150 and a coast side 152 spaced from the drive side 150 circumferentially about the central axis A. The windows 148 each have a window width W1 determined from the drive side 150 to the coast side 152 of the respective window 148. The window widths W1 may be substantially identical to each other. The windows 148 may be uniformly spaced from each other about the central axis A. By "substantially identical," we mean that window widths W1 may vary relative to each other due to manufacturing tolerances and capabilities.

With continued reference to FIG. 3, the reaction plate 144 may include a plurality of notches 154 extending radially therethrough. The notches 154 may be arranged on an outer periphery of the reaction plate 144. The plurality of notches 154 may be spaced from each other circumferentially about the central axis A. The notches 154 each may have a notch width W2 extending circumferentially about the central axis A. The notch width W2 may be less than the window width W1. The notch widths W2 may be substantially identical to each other. The plurality of notches 154 may be uniformly spaced from each other about the central axis A. Each notch 154 may be arranged between two circumferentially adjacent windows 148. The reaction plate 144 may include a greater number of windows 148 than a number of notches 154. For example, the reaction plate 144 may include two windows 148 arranged between circumferentially adjacent notches 154.

Returning to FIGS. 1-2B, the clutch pack 142 is disposed between the reaction plate 144 and the piston 140 and connected to the cover plate 134 of the damper assembly 108. The clutch pack 142 may include a clutch plate 156, a clutch plate 158, and a clutch plate 160.

The clutch plate 156 and the clutch plate 160 may be axially spaced from each other and directly connected to an input of the damper assembly 108. For example, the clutch plates 156, 160 each may be drivingly connected to the cover plate 134 to transfer torque thereto, e.g., via a tabbed connection.

The clutch plate 158 may be disposed axially between the clutch plates 156, 160. The clutch plate 158 may be supported by the reaction plate 144. For example, the clutch plate 158 may be engaged with the reaction plate 144, e.g., via a tabbed connection (as described further below), radially outside of the clutch plates 156, 160. Friction paper or rings (not numbered) may further be attached to the clutch plate 156, the clutch plate 158, the clutch plate 160, the reaction plate 144, and/or the piston 140. For example, friction materials (facings) may be attached to the clutch plates 156, 160 and clutch plate 158 may act as friction surface for the friction facings.

Figure 4:
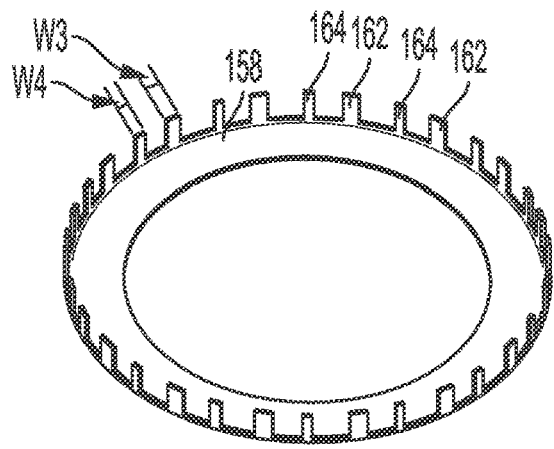
FIG. 4 illustrates a perspective view of a clutch plate of the torque converter shown in FIG. 1.
Figure 6A:
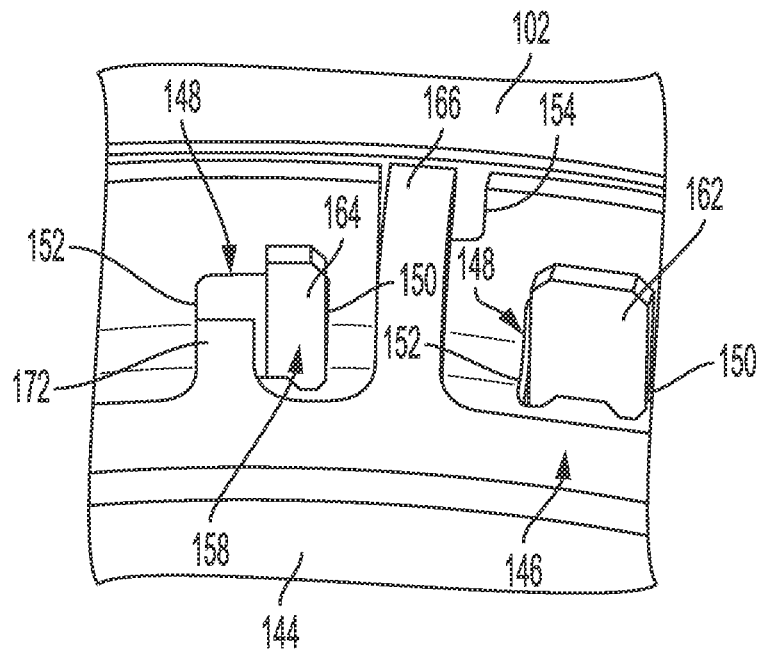
FIG. 6A illustrates the anti-rattle plate in a disengaged position.
Figure 6B:
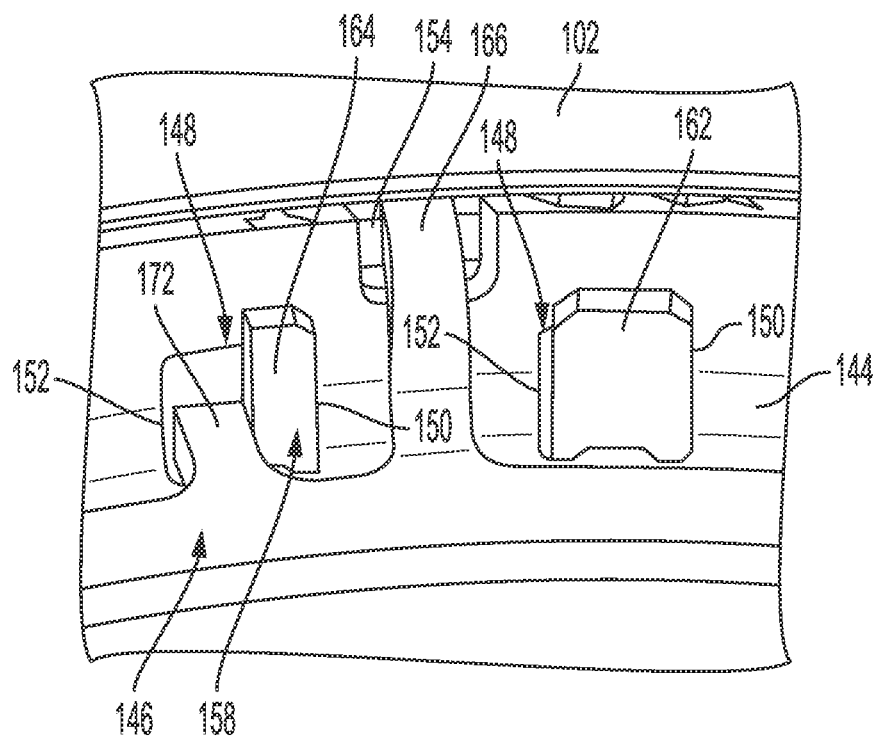
FIG. 6B illustrates the anti-rattle plate in an engaged position.

With reference to FIG. 4, the clutch plate 158 includes a plurality of first tabs 164 spaced from each other circumferentially about the central axis A. The plurality of first tabs 164 are arranged at an outer diameter of the clutch plate 158 and extend axially from the outer diameter of the clutch plate 158. Each first tab 164 includes a first width W4 that is less than the window width W1. Each of the first tabs 164 are configured to engage one respective window 148 of the reaction plate 144. That is, the plurality of first tabs 164 are arranged to be received by respective windows 148 of the reaction plate 144, as shown in FIGS. 6A-6B. For example, the plurality of first tabs 164 may extend axially through the respective windows 148 of the reaction plate 144. The plurality of first tabs 164 each are arranged to contact the drive side 150 of the respective window 148 and be spaced from the coast side 152 of the respective window 148.

With continued reference to FIG. 4, the clutch plate 158 may further include a plurality of second tabs 162. The plurality of second tabs 162 may be spaced from each other circumferentially about the central axis A. The plurality of second tabs 162 may be arranged at an outer diameter of the clutch plate 158 and may extend axially from the outer diameter of the clutch plate 158. For example, the plurality of second tabs 162 may be arranged alternatingly with the plurality of first tabs 164 about the central axis A. Each second tab 162 may include a second width W3 that is less than the window width W1. The first width W4 may also be less than the second width W3. Each of the second tabs 162 may be configured to engage one respective window 148 of the reaction plate 144. That is, the plurality of second tabs 162 may be arranged to be received by respective windows 148 of the reaction plate 144, as shown in FIGS. 6A-6B. For example, the plurality of second tabs 162 may extend axially through the respective windows 148 of the reaction plate 144. The plurality of second tabs 162 each may be arranged to contact the drive side 150 of the respective window 148 and be spaced from the coast side 152 of the respective window 148.

Figure 5:
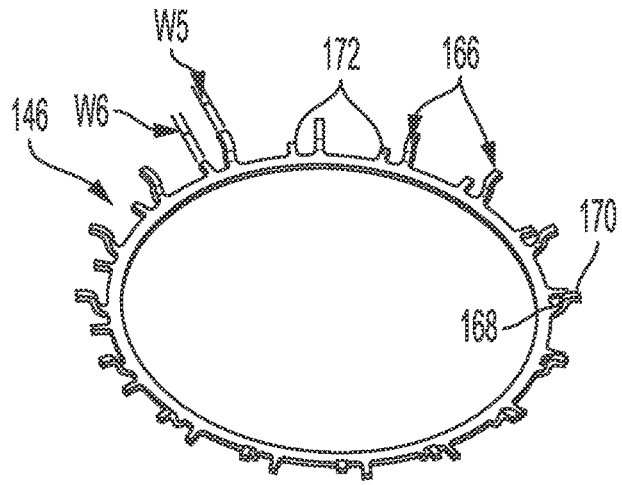
FIG. 5 illustrates a perspective view of an anti-rattle plate of the torque converter shown in FIG. 1.

The anti-rattle plate 146 extends annularly about the central axis A. The anti-rattle plate 146 is fixed relative to the reaction plate 144. For example, the anti-rattle plate 146 may include a plurality of first fingers 166 arranged on an outer diameter thereof, as shown in FIG. 5. The plurality of first fingers 166 may each extend from the outer diameter of the anti-rattle plate 146. Each first finger 166 may include an axial portion 168 extending axially from the outer diameter of the anti-rattle plate 146 and a radial portion 170 extending radially outward from the axial portion 168 to a first radial end. Each first finger 166, e.g., the first radial end thereof, may be fixed to the front cover 102 via a weld, for example, as shown in FIG. 2B. The first fingers 166 may be fixed to the front cover 102 via a same or different weld as the reaction plate 144. Alternatively, the anti-rattle plate 146 may be fixed to the reaction plate 144, e.g., via a weld.

With reference to FIG. 5, the plurality of first fingers 166 may be circumferentially spaced from each other. Each first finger 166 may be circumferentially aligned with one respective notch 154. Each finger 166, e.g., the respective radial portion 170, is arranged to extend through one respective notch 154. That is, each notch 154 is configured to receive one respective finger 166, e.g., radial portion 170 thereof. Each first finger 166 may include a first finger width W5 that is less than the notch width W2. A number of first fingers 166 may match a number of notches 154.

With continued reference to FIG. 5, the anti-rattle plate 146 includes a plurality of second fingers 172 arranged on the outer diameter thereof. The plurality of first fingers 166 may be arranged alternatingly with the plurality of second fingers 172 about the central axis A. The plurality of second fingers 172 each extend radially outward from the outer diameter of the anti-rattle plate 146 to a second radially outer end. The second radially outer ends are arranged radially inside of the first radially outer ends. Each second finger 172 extends into one respective window 148. Specifically, each second finger 172 extends into a same window 148 as one respective first tab 164, as shown in FIGS. 6A-6B. Each second finger 172 is circumferentially aligned with the corresponding first tab 164 in the respective window 148. That is, a line extending circumferentially about the central axis A passes through the first tab 164 and the second finger 172 in a window 148. Each second finger 172 includes a second finger width W6 that is less than the window width W1. The second finger width W6 and the second width W4 combined are less than the window width W1. A number of second fingers 172 may match a number of first tabs 164.

Each second finger 172 is arranged in the respective window 148 between the corresponding first tab 164 and the coast side 152 of the window 148. During assembly of the lock-up clutch assembly 110, the anti-rattle plate 146 is aligned relative to the reaction plate 144 such that each second finger 172 is arranged circumferentially between one first tab 164 and the coast side 152 of one respective window 148. Additionally, the anti-rattle plate 146 is rotatable relative to the reaction plate 144 from a disengaged position (as shown in FIG. 6A) to an engaged position (as shown in FIG. 6B). In the disengaged position, each second finger 172 is spaced from the corresponding first tab 164 in the respective window 148. Each second finger 172 may contact the coast side 152 of the respective window 148 in the disengaged position. In the engaged position, each second finger 172 contacts the corresponding first tab 164 in the respective window 148. Specifically, each second finger 172 compresses the corresponding first tab 164 against the drive side 150 in the respective window 148. In the engaged position, each second finger 172 is spaced from the coast side 152 of the respective window 148.

The following should be viewed in light of FIGS. 1-6B. The following describes an exemplary method of operating the lock-up clutch assembly 110 in a drive mode, i.e., to transmit a drive torque. However, it is to be understood that the method may include fewer steps and/or the steps may be executed in a different order. A first step provides a drive torque to the front cover 102. A second step transmits the drive torque to the reaction plate 144 via an interface between the reaction plate 144 and the front cover 102. A third step transmits the drive torque to the clutch plate 158 via interfaces between each of the plurality of tabs 162, 164 and the drive side 150 of the respective windows 148. A fourth step transmits the drive torque to the clutch plates 160, 156, e.g., via the friction surfaces between the clutch plates 156, 158, 160. A fifth step transmits the drive torque to the damper assembly 108, e.g., via the tabbed connection between the clutch plates 156, 160 and the cover plate 134.

The following should be viewed in light of FIGS. 1-6B. The following describes an exemplary method of operating the lock-up clutch 110 in a coast mode, i.e., to transmit a coast torque. However, it is to be understood that the method may include fewer steps and/or the steps may be executed in a different order. A first step provides the coast torque to the transmission input shaft 124. A second step transmits the coast torque to the damper assembly 108 via an interface between the transmission input shaft 124 and the output flange 138. A third step transmits the coast torque to the clutch plates 156, e.g., via the tabbed connection between the clutch plates 156, 160 and the cover plate 134. A fourth step transmits the coast torque to the clutch plate 158, e.g., via the friction surfaces between the clutch plates 156, 158, 160. A fifth step transmits the coast torque to the anti-rattle plate 146 via interfaces between each of the plurality of second fingers 172 and the respective first tabs 164. A sixth step transmits the coast torque to the front cover 102 via interfaces between each second finger 172 and the front cover 102.

Figure 7:
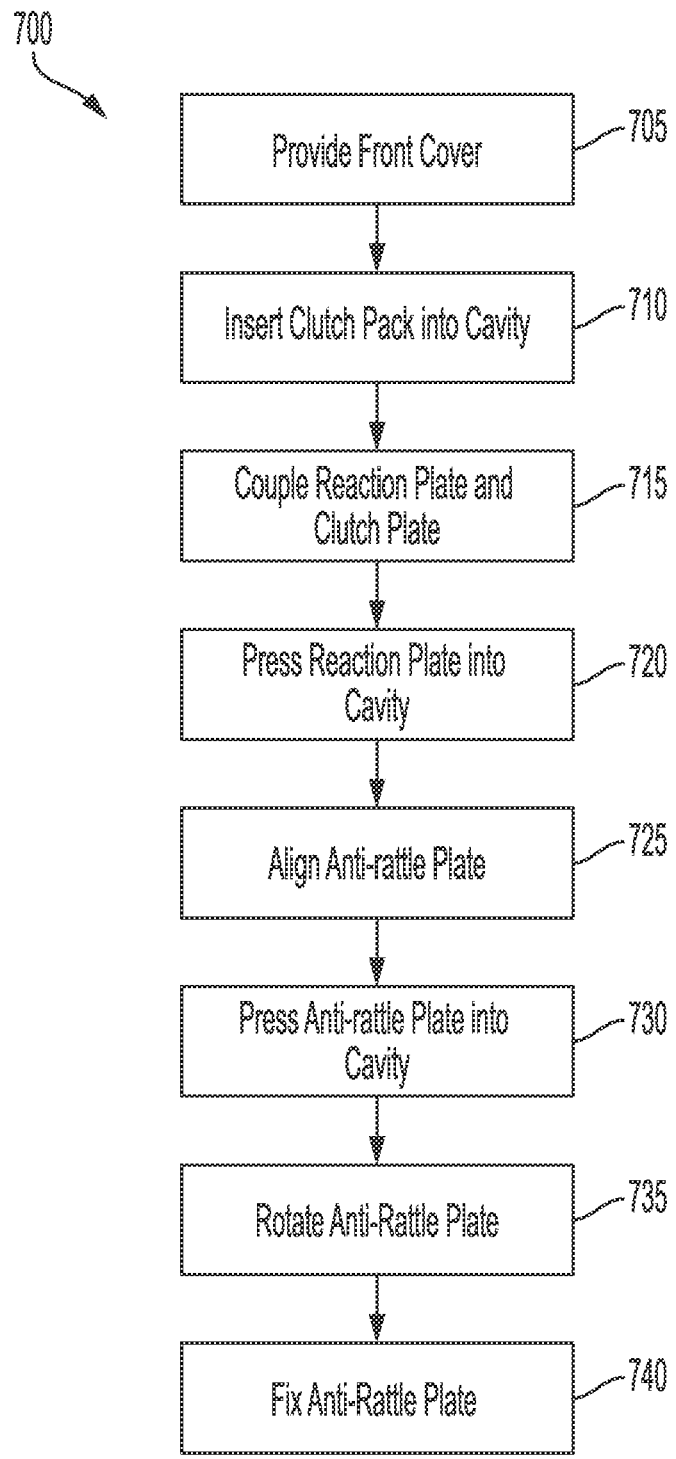
FIG. 7 illustrates a flowchart of a process for assembling the torque converter with the anti-rattle plate according to an exemplary embodiment of the present disclosure.

Referring to FIG. 7, a flowchart of a process 700 of assembling a torque converter with an anti-rattle plate in accordance with an embodiment of this disclosure is shown. However, it is to be understood that the process 700 may include fewer steps and/or the steps may be executed in a different order. The process 700 begins in a block 705 by providing the front cover 102. In a block 710, the clutch pack 142 is inserted into a cavity defined by the front cover 102. In a block 715, the reaction plate 144 is coupled to the clutch plate 158 by inserting each of the tabs 162, 164 into one respective window 148. In a block 720, the reaction plate 144 is pressed into the cavity. In a block 725, the anti-rattle plate 146 is provided and aligned relative to the reaction plate 144. That is, each second finger 172 is inserted into one respective window 148 with a corresponding first tab 164. Additionally, each of the plurality of first fingers 166 may be aligned with one respective notch 154. In a block 730, the anti-rattle plate 146 is press-fit into the cavity. In the block 735, the anti-rattle plate 146 is rotated relative to the reaction plate 144 from the disengaged position to the engaged position. Rotating the anti-rattle plate 146 to the engaged position reduces or eliminates lash between the first tabs 164 and the respective windows 148. In a block 740, the anti-rattle plate 146 is fixed relative to the front cover 102, e.g., via a weld. Additionally, the reaction plate 144 is fixed to the front cover 102, e.g., via a weld. As one example, the anti-rattle plate 146 and the reaction plate 144 may be fixed to the front cover 102 via a same weld. As another example, the anti-rattle plate 146 may be fixed to the reaction plate 146, as discussed above.

Embodiments according to the present disclosure provide various advantages including providing an anti-rattle plate that compresses tabs of a clutch plate against a drive side of respective windows in a reaction plate to reduce or eliminate lash between the clutch plate and the reaction plate, which can improve NVH between the clutch plate and the reaction plate when the lock-up clutch assembly 110 is open.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 damper assembly
110 lock-up clutch assembly
112 impeller shell
114 impeller blade
116 impeller hub
118 turbine shell
120 turbine blade
122 stator
124 transmission input shaft
126 one-way clutch
128 thrust bearing
130 side plate
132 spring
134 cover plate
136 cover plate
138 output flange
140 piston
142 clutch pack
144 reaction plate
146 anti-rattle plate
148 window
150 drive side
152 coast side
154 notch
156 clutch plate
158 clutch plate
160 clutch plate
162 tab
164 tab
166 finger
168 axial portion
170 radial portion
172 finger
174 seal
176 hub
178 seal
180 apply chamber
700 process
705 block
710 block
715 block
720 block
725 block
730 block
735 block
740 block
745 block
A central axis
W1 width
W2 width
W3 width
W4 width
W5 width
W6 width
AD1 axial direction
AD2 axial direction

What is claimed is:

1. A torque converter, comprising:
a front cover arranged to receive a torque;
a lock-up clutch engaged with the front cover, the lock-up clutch including:
a reaction plate fixed to the front cover, the reaction plate including a plurality of windows circumferentially spaced from each other;
a clutch plate including a plurality of tabs each being engaged with the reaction plate via one respective window; and
an anti-rattle plate fixed relative to the front cover and engaged with each tab in the corresponding windows.

2. The torque converter of claim 1, wherein the anti-rattle plate circumferentially compresses each tab against the reaction plate in the corresponding windows.

3. The torque converter of claim 1, wherein the plurality of tabs are configured to receive a drive torque and transmit a coast torque.

4. The torque converter of claim 1, wherein the clutch plate includes a plurality of further tabs each being engaged with the reaction plate via one respective window, each of the plurality of tabs being circumferentially spaced from each of the plurality of further tabs.

5. The torque converter of claim 4, wherein the plurality of tabs and the plurality of further tabs are alternatingly arranged circumferentially about the clutch plate.

6. The torque converter of claim 4, wherein each of the plurality of further tabs are configured only to receive a drive torque, and the plurality of tabs are configured to receive the drive torque and to transmit a coast torque.

7. The torque converter of claim 1, wherein the anti-rattle plate includes a plurality of fingers circumferentially spaced from each other, each finger contacts one respective tab in one respective window.

8. The torque converter of claim 7, wherein the plurality of fingers extend radially outward from an outer diameter of the anti-rattle plate.

9. The torque converter of claim 1, wherein each window includes a drive side and a coast side spaced circumferentially from the drive side, the plurality of tabs each being in contact with the drive side of the respective window and being spaced from the coast side of the respective window.

10. The torque converter of claim 9, wherein the clutch plate is arranged to receive a drive torque via interfaces between each tab and the respective drive side of the corresponding windows.

11. The torque converter of claim 9, wherein the anti-rattle plate includes a plurality of fingers each configured to engage one respective tab, each finger contacts the one respective tab in the one respective window.

12. The torque converter of claim 11, wherein each of the plurality of fingers is spaced from the respective coast side of the one respective window.

13. The torque converter of claim 12, wherein the clutch plate is arranged to transmit a coast torque via interfaces between each finger and the corresponding tabs.

14. The torque converter of claim 1, wherein:
the reaction plate includes a plurality of notches circumferentially spaced from each other, each notch being arranged between two circumferentially adjacent windows of the plurality of windows; and
the anti-rattle plate includes a plurality of fingers fixed to the front cover, each of the fingers extending through one respective notch.

15. The torque converter of claim 14, wherein the anti-rattle plate includes a plurality of further fingers each arranged circumferentially adjacent to one respective finger, each further finger extending through one of the two circumferentially adjacent windows.

16. The torque converter of claim 15, wherein each tab is arranged circumferentially between one respective finger and one respective further finger.

17. The torque converter of claim 15, wherein the plurality of further fingers are arranged to receive a coast torque from the clutch plate.

18. The torque converter of claim 17, wherein each tab is in contact with the reaction plate and one respective further finger in the one of the two circumferentially adjacent windows.

19. The torque converter of claim 1, wherein the clutch plate is disposed axially between the anti-rattle plate and the front cover.

20. A method for assembling a torque converter, comprising:
- providing a front cover defining a cavity;
- inserting a clutch plate into the cavity, wherein the clutch plate includes a plurality of tabs;
- providing a reaction plate including a plurality of windows circumferentially spaced from each other;
- coupling the clutch plate to the reaction plate by inserting each of the tabs into one respective window;
- aligning an anti-rattle plate relative to the reaction plate;
- pressing the anti-rattle plate into the cavity;
- rotating the anti-rattle plate relative to the reaction plate to compress the tabs against the reaction plate in the respective windows; and
- fixing the anti-rattle plate relative to the front cover.

* * * * *